United States Patent
Rafler et al.

(10) Patent No.: US 9,079,667 B2
(45) Date of Patent: Jul. 14, 2015

(54) MOVABLE CONNECTING PLATE FOR CONNECTING TWO OVERHEAD STORAGE COMPARTMENT ELEMENTS

(75) Inventors: Markus Rafler, Ichenhausen (DE); Dirk Fischer, Stolberg-Vicht (DE)

(73) Assignee: DIEHL AIRCABIN GMBH, Laupheim (DE)

( * ) Notice: Subject to any disclaimer, the term of this patent is extended or adjusted under 35 U.S.C. 154(b) by 641 days.

(21) Appl. No.: 13/408,543

(22) Filed: Feb. 29, 2012

(65) Prior Publication Data

US 2012/0223188 A1   Sep. 6, 2012

(30) Foreign Application Priority Data

Mar. 3, 2011   (DE) .......................... 10 2011 012 894

(51) Int. Cl.
   *B64D 11/00*   (2006.01)
(52) U.S. Cl.
   CPC .................................... *B64D 11/003* (2013.01)
(58) Field of Classification Search
   CPC ... A47B 87/008; A47B 87/007; B64D 11/003
   USPC ............... 244/118.1, 129.1, 131; 403/380; 248/225.11
   See application file for complete search history.

(56) References Cited

U.S. PATENT DOCUMENTS

| 5,108,048 A * | 4/1992 | Chang ......................... 244/118.1 |
| 2006/0086886 A1 * | 4/2006 | Humfeldt et al. ............. 248/636 |
| 2007/0084966 A1 | 4/2007 | Haynes et al. |
| 2010/0060198 A1 | 3/2010 | van Endert |
| 2010/0200696 A1 * | 8/2010 | Pein et al. .................. 244/118.2 |
| 2010/0301167 A1 | 12/2010 | Humfeldt et al. |

FOREIGN PATENT DOCUMENTS

| DE | 101 13 500 A1 | 10/2002 |
| DE | 10 2007 044 448 A1 | 3/2008 |
| DE | 10 2008 015 712 A1 | 10/2008 |
| DE | 10 2008 064 073 A1 | 6/2010 |
| DE | 10 2009 023 400 A1 | 12/2010 |
| WO | WO 01/44670 A1 | 6/2001 |

* cited by examiner

*Primary Examiner* — Brian M O'Hara

(74) *Attorney, Agent, or Firm* — Scully, Scott, Murphy & Presser, P.C.

(57) ABSTRACT

A fastening device for connecting two overhead storage compartment elements of an aircraft is provided. The overhead storage compartment elements have coupling elements on the sides of the overhead storage compartment elements to be connected. The coupling elements need to be aligned with one another without being subjected to loading. A connecting plate is arranged on a first fastening element, in a longitudinally movable manner. In the delivered state of the overhead storage compartment elements, the connecting plate is already connected to the fastening element and pushed beneath the lower face of the overhead storage compartment element, so that it does not protrude and does not interfere when the bulky overhead storage compartment element is handled before attaching to the cabin ceiling.

9 Claims, 10 Drawing Sheets

MOVABLE CONNECTING PLATE FOR CONNECTING TWO OVERHEAD STORAGE COMPARTMENT ELEMENTS

FIELD OF THE INVENTION

The invention relates to a fastening device for connecting together at least two overhead storage compartment elements in an aircraft cabin, to this end the overhead storage compartment elements comprising fastening elements on side walls facing one another.

BACKGROUND TO THE INVENTION

Generic fastening devices are used in order to connect together the overhead storage compartment elements in aircraft cabins. Generally, the overhead storage compartment elements have been previously attached to fastening points on the cabin deck by fastening means arranged on their upper faces. Due to tolerances, slight deviations in the positions of the overhead storage compartment elements occur in the fastening points and the overhead storage compartment elements. Deviations in the position are disadvantageous both for the visual appearance of the overhead storage compartment elements in the direction of the longitudinal axis of the aircraft (X-axis) and for aligning the so-called passenger service channel (PSC). The passenger service channel comprises, on the sides of the overhead storage compartment elements to be connected, coupling elements which have to be aligned with one another without being subjected to load. The overhead storage compartment elements are, therefore, fastened together at their sides facing one another on their lower faces facing the cabin floor. High requirements are set in the aircraft industry for the fatigue strength, the fire resistance and the noise properties of the fastenings. At the same time, the components have to be as lightweight as possible in order to keep the fuel consumption as low as possible. During the flight, the cabin is subjected to changing loads so that forces act on the overhead storage compartment elements.

The fastening devices known from the prior art additionally have to be arranged on the overhead storage compartment elements after the overhead storage compartment elements have been attached to the cabin ceiling. The additional time required therefor is considerable, with the large number of overhead storage compartment elements to be connected together.

SUMMARY OF THE INVENTION

The object of the invention is to provide a fastening device by which the overhead storage compartment elements are able to be connected together with little additional assembly effort during final assembly.

This object is achieved by exemplary aspects or embodiments of the invention, which may be expediently combined together in terms of technology and exhibit further advantages of the invention. The description, in particular in combination with the figures, additionally characterizes and specifies the invention.

Accordingly, a fastening device is provided for connecting together two overhead storage compartment elements in an aircraft cabin, the overhead storage compartment elements comprising fastening elements (brackets) on sides facing one another, of which a first fastening element is designed to receive a connecting plate in a longitudinally movable manner, so that the connecting plate may be brought closer to the fastening element of an adjacent overhead storage compartment element and may be fastened thereto.

By means of this solution, a fastening device is provided which is already captively connected to the overhead storage compartment elements before introducing the overhead storage compartment elements into the aircraft cabin. When fastening the overhead storage compartment elements together, only the connecting plate has to be moved in the direction of the adjacent overhead storage compartment element and fastened to the fastening element arranged thereon. As a result, the time for fastening the fastening elements in the overhead storage compartments may be saved. On one edge facing in the positive or negative longitudinal direction (X-direction) of the aircraft, the overhead storage compartment elements comprise the first fastening element and, on the opposing edge of the next overhead storage compartment element facing away therefrom, the second fastening element. As the fastening device is arranged on the edges of the overhead storage compartment elements, said overhead storage compartment elements are easier to reach for the fitter than conventional fastening devices in which access is required partially in the narrow spaces between the overhead storage compartment elements.

According to an advantageous embodiment of the invention, the connecting plate comprises slots with which a fastening means connected to the first fastening element cooperates for providing the longitudinal mobility of the connecting plate relative to the fastening element. Pins or bolts protruding through the slots are suitable as fastening means.

According to a further advantageous embodiment of the invention, the fastening elements comprise on their side in contact with the connecting plate at least one latching lug extending transversely to the longitudinal direction and designed to engage in grooves which are provided on the connecting plate and which also extend transversely. The at least one latching lug already engages in one of the grooves when the fitter pushes the connecting plate over the second fastening element.

As a result, the connecting plate is held in the desired position before the final fastening. Errors caused by incorrect mounting may be eliminated thereby. Additionally, the connecting plate is held positively in the X-direction.

According to a preferred embodiment of the invention, the fastening elements are bonded into recesses provided on the side walls of the overhead storage compartment elements, so that a partially positive connection is provided. As a result, the fastening elements may transmit relatively high forces to the side walls and centre the passenger service channel (PSC).

According to an advantageous embodiment of the invention, the fastening elements are designed to be L-shaped on their side facing upwards, the one limb bearing flat against an inner face of the side wall of the overhead storage compartment element and the other limb bearing flat in the recess against the side wall. By this design, an arrangement of the fastening elements which takes into account the loading and is a positive arrangement in the X-direction may be achieved.

Moreover, in an advantageous embodiment the fastening elements may be configured to be U-shaped on their side facing the overhead storage compartments, the one limb bearing against an inner face of the side wall of the overhead storage compartment element, the lower face bearing flat in the recess of the side wall and the other limb bearing flat against an outer face of the side wall. The fastening element thus encompasses the side wall so that a positive connection is formed in the positive and negative X-direction. The fastening element may, therefore, introduce high bending moments into the side walls in a manner which is advantageous for bonded surfaces.

In a development of the invention, the fastening elements comprise centring chamfers configured as bevels, which hold the connecting plate on its sides extending parallel to the longitudinal direction. As a result, the rigidity of the fastening element may be increased in the Y-direction.

According to a further advantageous embodiment of the invention, the connecting plate may be pulled in fully towards the lower face of the overhead storage compartment element. As a result, a fastening device is provided which in the unmounted state does not protrude over the lower face of the overhead storage compartment elements into the cabin space. This is advantageous during transport of the overhead storage compartment elements where protruding parts require additional space. Additionally, when inserting the overhead storage compartment elements into the aircraft cabin, injuries to personnel or damage to other aircraft parts may be avoided if no parts protrude over the overhead storage compartment elements.

According to a particularly advantageous embodiment of the invention, the connecting plate is connected via screws to the fastening elements. The screws thus penetrate the slots on the first fastening element, whereby the longitudinal mobility of the connecting plate is provided. On the side facing the second fastening element, the connecting plate preferably comprises slots which are open on one side, and which during mounting are guided towards screws which are provided on the second fastening element.

According to a further advantageous embodiment of the invention, the screws comprise a first torque transmission region arranged on the outside of a screwhead and a second torque transmission region arranged centrally on the screwhead. The first torque transmission region may be designed here as an octagonal region. In this case, the second torque transmission region may be a centrally arranged conventional crosshead slot. Thus two options are available to the fitter for tightening the screws.

Further details and advantages of the invention are made clear in the exemplary embodiments shown in the drawings, in which.

DETAILED DESCRIPTION OF EXEMPLARY EMBODIMENTS

The longitudinal direction or flight direction of an aircraft is denoted by the X-direction. The Y-direction extends transversely to the longitudinal direction and the Z-direction along the vertical axis of the aircraft.

Figure 1:
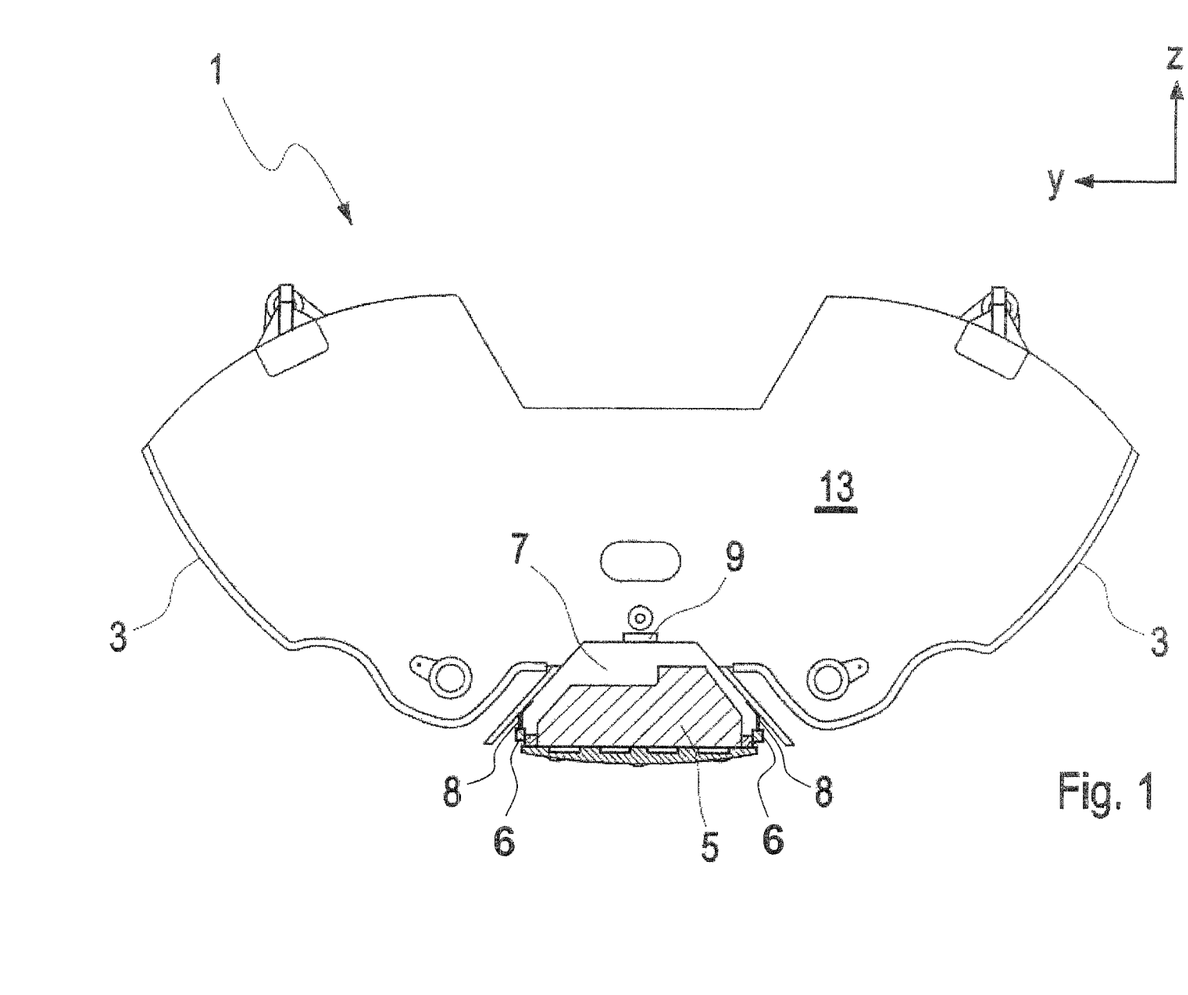
FIG. 1 shows an overhead storage compartment element for the centre of wide aircraft cabins.

FIG. 1 shows an overhead storage compartment element 1 for arranging in the centre of an aircraft. Such overhead storage compartment elements 1 are arranged in succession in wide aircraft, which comprise a plurality of gangways, over the central seat rows in the longitudinal direction of the aircraft. Storage compartments 3 which may be closed by flaps, not shown, are arranged to the right and left. In the centre, on a side of the overhead storage compartment elements 1 facing towards the cabin floor, passenger service units (PSU) 5 are arranged in a passenger service channel (PSC) 7. On the lower face facing the passengers, the passenger service units 5 have schematically indicated air nozzles, control knobs, reading lights, seat belt symbols and the like.

For fastening the passenger service units 5 in the passenger service channel 7, a rail system 8 is used, into which the passenger service units 5 are displaceably latched by holders 6 in the X-direction. The arrangement of the passenger service units 5 in the X-direction is carried out individually for each aircraft layout relative to the seat position so that the passenger is able to use any function from the comfort of a seat. The passenger service units 5 may also be of different lengths. The passenger service units 5 may consequently be adjacent to one another at different X-positions from those of the overhead storage compartment elements 1. For fastening the passenger service units to the rail system, the rails of adjacent storage compartment elements in the X-direction have to be correctly aligned, so that narrow tolerances have to be maintained. To this end, the overhead storage compartment elements have a fastening device 9 on their lower face on adjacent side walls 13.

Figure 2:
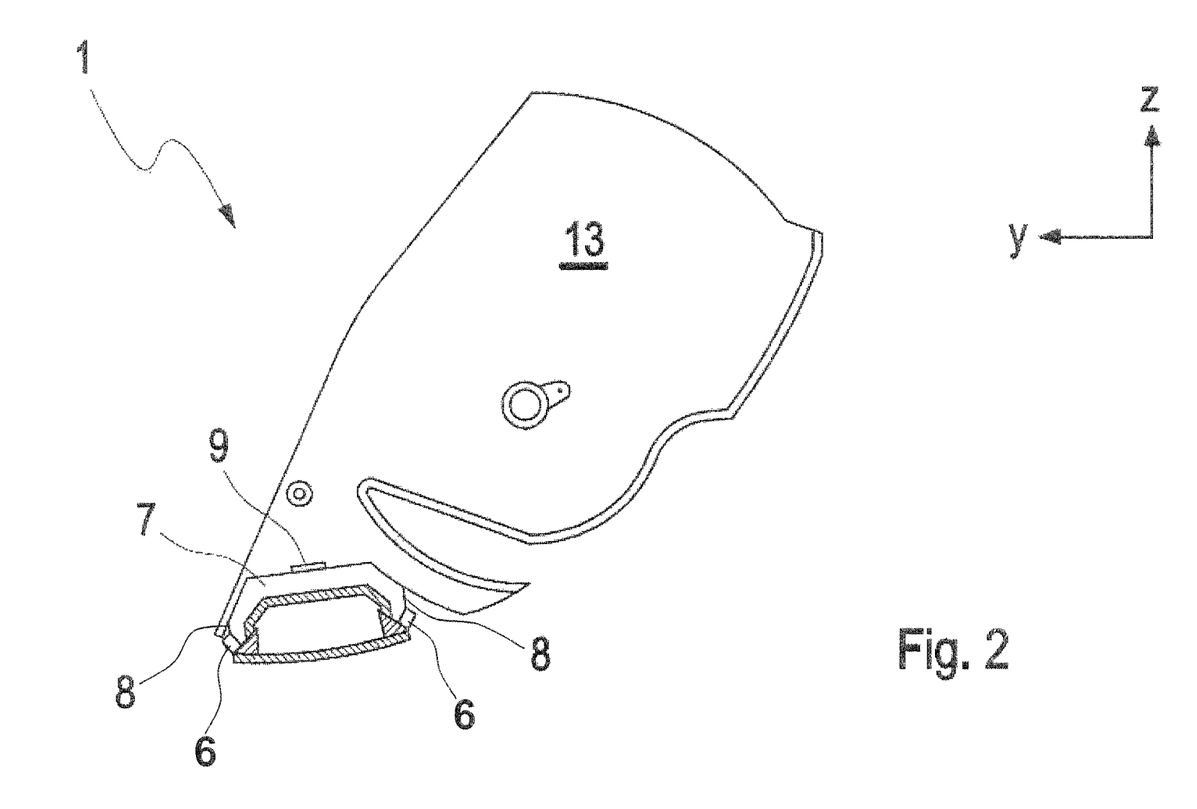
FIG. 2 shows an overhead storage compartment element for arranging on the window seat rows of an aircraft cabin.

In FIG. 2, an overhead storage compartment element 1 for arranging over the lateral seat rows of an aircraft is shown in a cutaway front view. The lateral overhead storage compartment elements 1 are connected together in the same manner via fastening devices 9.

Figure 3:
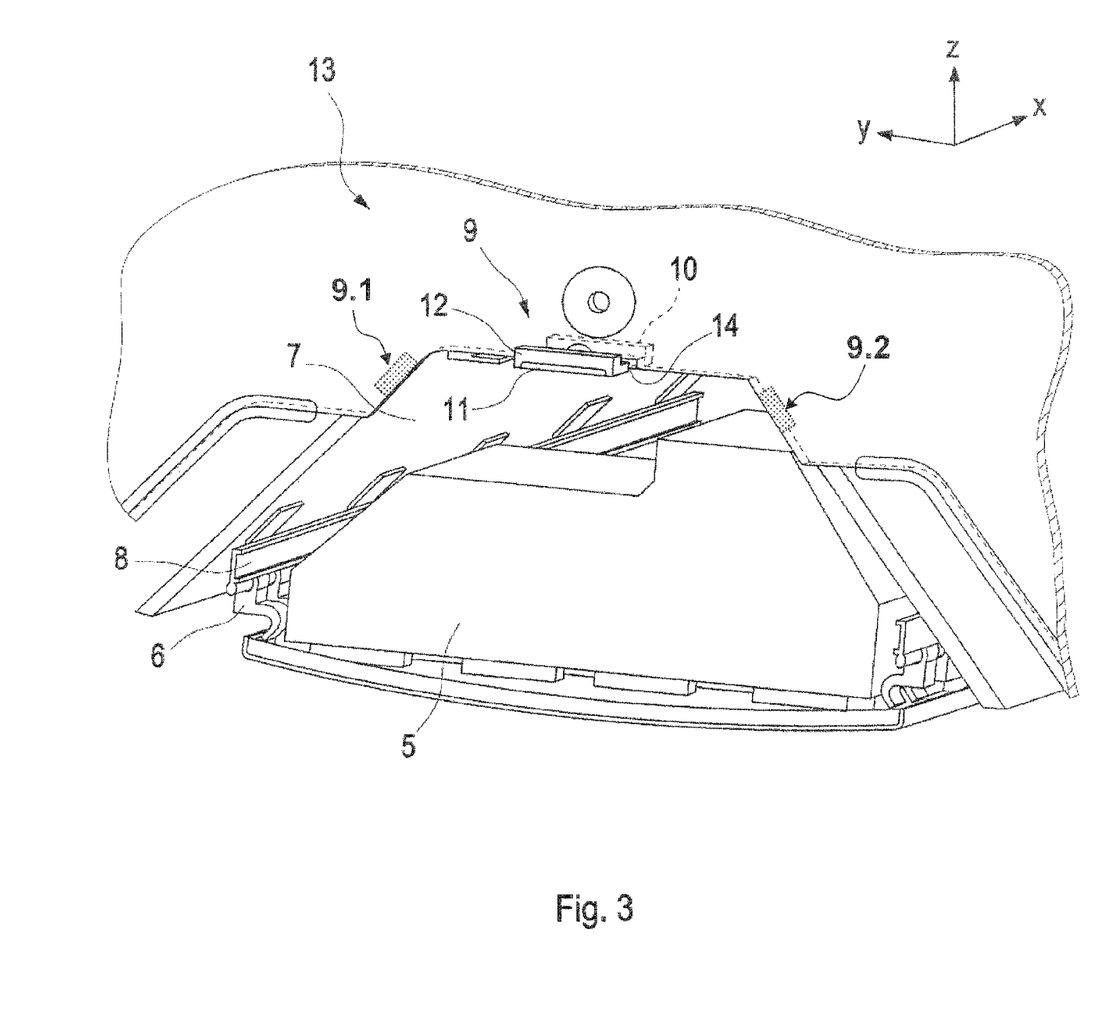
FIG. 3 shows an overhead storage compartment element with a passenger service unit (PSU) arranged therebelow, and a fastening device protruding out of the side wall of the overhead storage compartment element.

FIG. 3 shows a perspective view of an overhead storage compartment element 1 with a passenger service unit 5. The side walls 13 are designed to be planar and not completely rigid but slightly flexible in the X-direction. In FIG. 3, a first fastening element 10 shown in dashed lines is bonded in a recess 14 on the side wall 13. In this case, the recess 14 grips the fastening element 9 in the Y-axis on both sides, so that an additional positive connection is produced in the direction of this axis. Via the fastening element 9, a stable interface is produced between the connecting plate 11 and the side wall 13. On the connecting plate 11 a second fastening element 12 is arranged which might be bonded in the aircraft into the side wall 13 of an adjacent storage compartment element, not shown.

By fastening the overhead storage compartment elements in the immediate vicinity of the holders 6 for the passenger service unit 5, said overhead storage compartment elements are held aligned in the X-direction in a stable manner. As a result, a passenger service unit 5 is able to extend easily over the gap between two overhead storage compartment elements 1 connected by the fastening device 1.

In FIG. 3, moreover, an alternative installed position for fastening elements is indicated. In the alternative installed position on opposing, in this case oblique, passenger service channel walls, alternative fastening elements 9.1 and 9.2 are attached which in their function substantially correspond to the fastening element 9. The alternative fastening elements 9.1 and 9.2 may be configured to be smaller, in particular narrower, in particular half as narrow, in comparison with the fastening element 9. Other installed positions, in particular within the passenger service channel 7, and the provision of more than two alternative fastening elements are possible.

Figure 4:
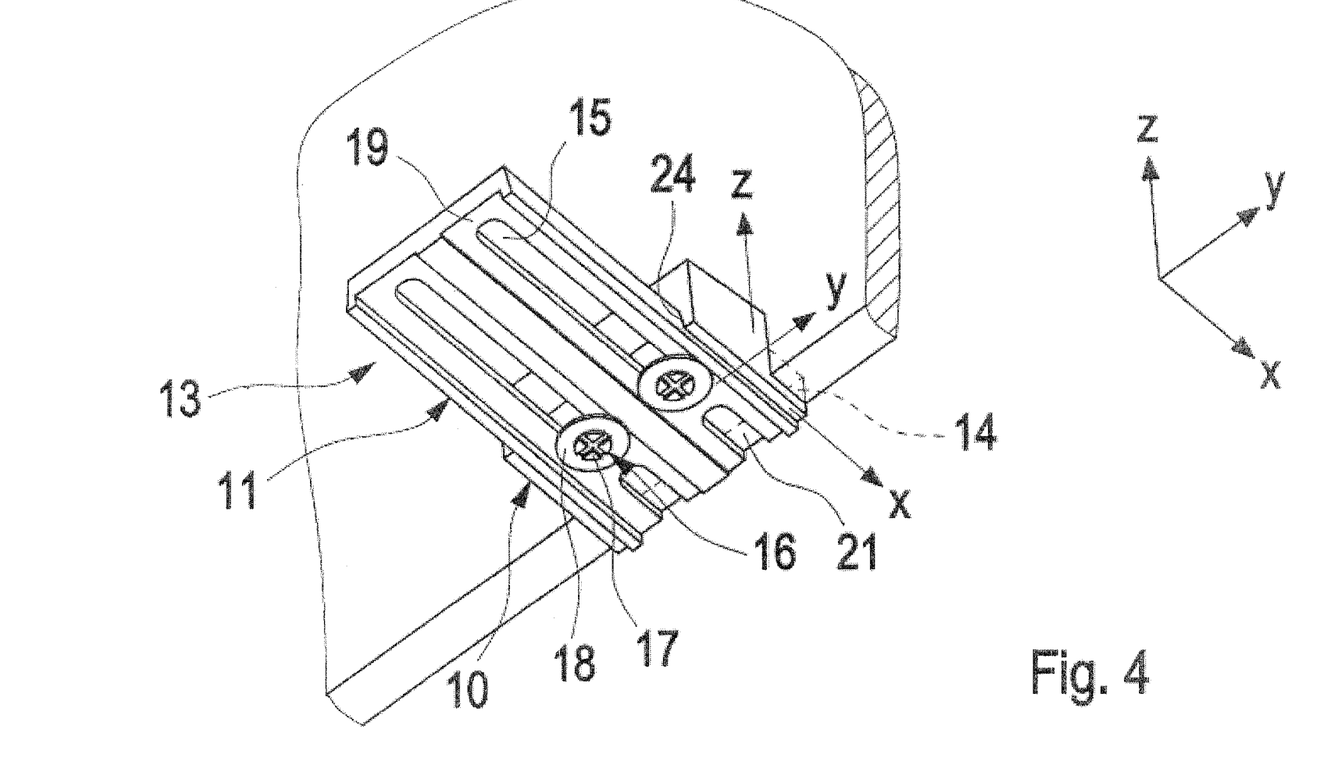
FIG. 4 shows a fastening element of L-shaped design arranged on a side wall, with a connecting plate arranged thereon.

FIG. 4 shows in a perspective view a first fastening element 10 arranged on a side wall 13, with a connecting plate 11 arranged therebelow. The connecting plate 11 comprises two slots 15, in which in each case a screw 16 is arranged. Via the slots 15 the connecting plate 11 is movably arranged relative to the fastening element 10 in the X-direction. The screws 16 have on their screwhead 17 a widened bearing surface 18 which alternatively may also be achieved by a washer. The connecting plate 11 comprises grooves 19 which extend parallel to the slots 15, and which are substantially sufficiently deep for the bearing surface 18 of the screws 16 to terminate flush with the upper edge of the grooves 19.

The connecting plate 11 is located in FIG. 4 in the fully retracted position, i.e. the transport position. The overhead storage compartment elements 1 reach the aircraft manufacturer as preassembled, finished units to which the fastening elements 10 and/or 12 have already been bonded and the connecting plate 11 is already connected by screws 16 to one of the fastening elements 10 or 12. The screws 16 are preferably only slightly tightened so that the connecting plate 11 is secured, but may be unscrewed by hand and without tools in order to be fastened to a second fastening element of an adjacent overhead storage compartment element 1. Preferably, the first fastening elements 10 are in each case arranged with the preassembled connecting plate 11 on the side walls 13 facing in the positive X-direction, i.e. in the flight direction, and the second fastening elements 12 in each case on the sides of the storage compartment elements 1 facing in the negative X-direction. As a result, it may be avoided that the connecting plates 11 are missing or too many are delivered.

Figure 7:
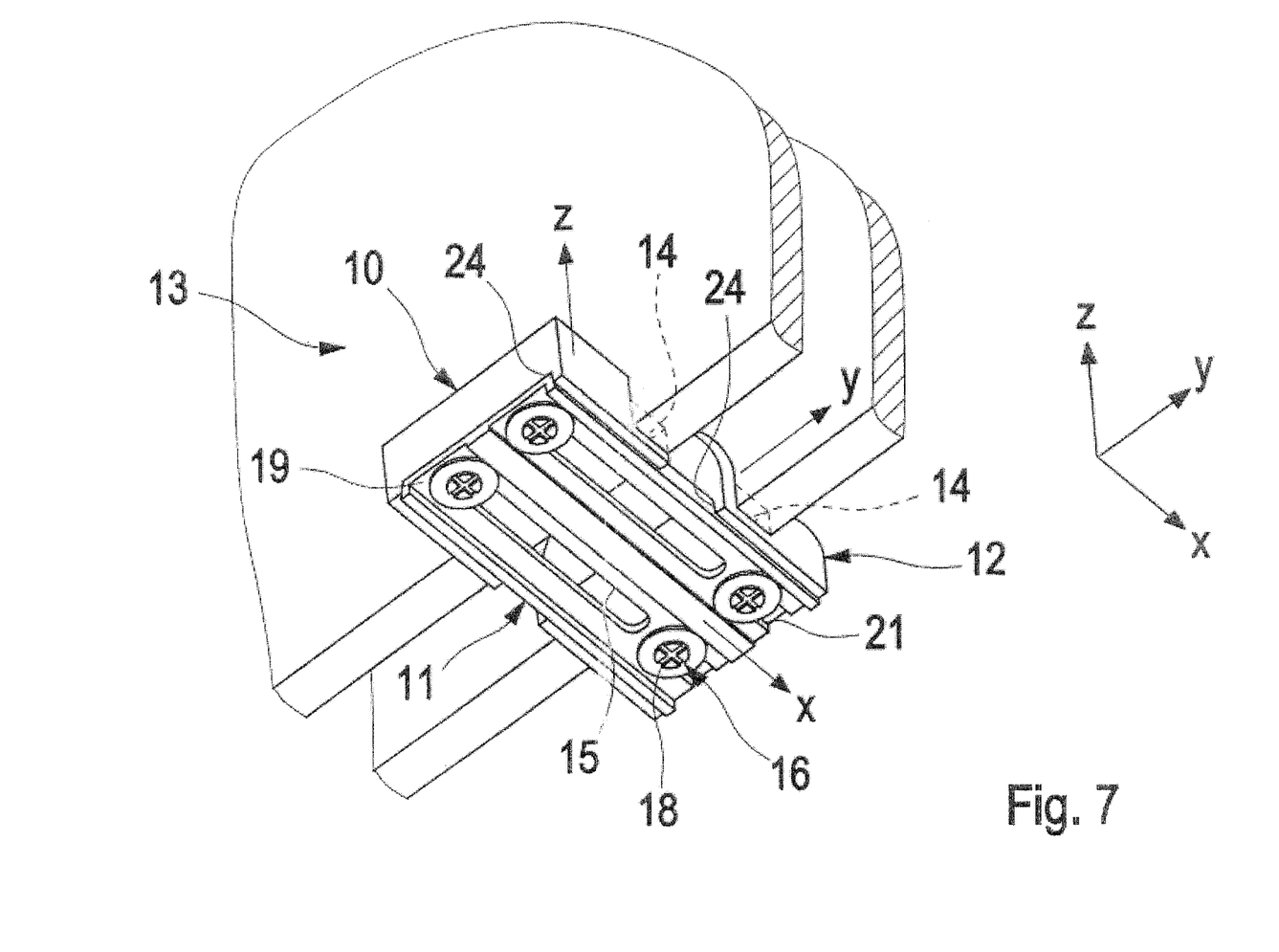
FIG. 7 shows a fastening device connecting two side walls together with a first fastening element, a connecting plate and a second fastening element.

During mounting, the screws 16 are slightly loosened, so that the connecting plate 11 may be pulled in the direction of the adjacent fastening element 12. The connecting plate 11 has two slots 21 which are open on one side and which, when displacing the connecting plate 11 in the direction of the second fastening element 12 shown in FIG. 7, encompass screws 16 arranged thereon. In this case, the screws 16 on the second fastening element 12 may be identical to the screws 16 of the first fastening element 12. Subsequently, all four screws 16 are secured as shown in FIG. 7. As slots 15 are on the connecting plate 11, it is possible to compensate for deviations in the spacings in the X-direction.

Figure 5:
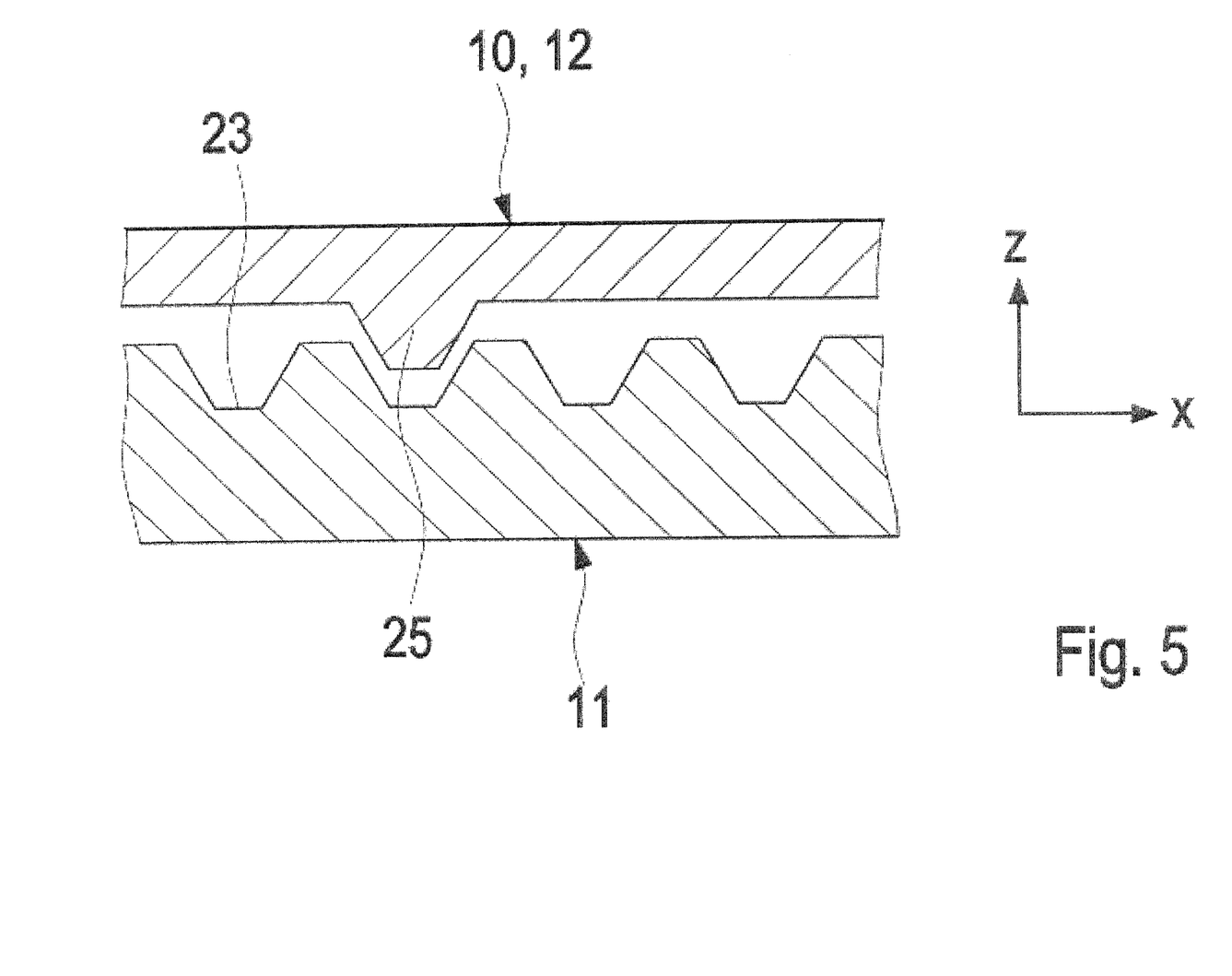
FIG. 5 shows in a side view a partial detail of a connecting plate with latching grooves arranged thereon, into which a latching lug arranged on the fastening element engages.

For improving the mountability and the stability in the mounted state, the connecting plate 11 has on its upper face a plurality of latching grooves 23 as shown in FIG. 5. A latching lug 25 arranged on the lower face of the fastening elements engages in the latching grooves 23. As a result, the connecting plate 11 does not tend to slide again out of its position during mounting. Furthermore, the latching grooves 23 ensure a positive connection in the X-direction, which increases the non-positive screw connection via the screws 16. As a result, a fastening device 9 is produced which may be very easily mounted and has excellent strength properties. This also serves for improving the noise properties, as otherwise, when subjected to loading during the flight, minimal relative movements between the connecting plate and the fastening elements could produce noise.

It should be noted that instead of the one latching lug a plurality of latching lugs 25 may also be provided, in particular arranged in succession, said latching lugs being able to engage in corresponding, in particular adjacent, latching grooves 23. As a result, an improved and more stable latching may be achieved with improved force transmission.

Figure 6:
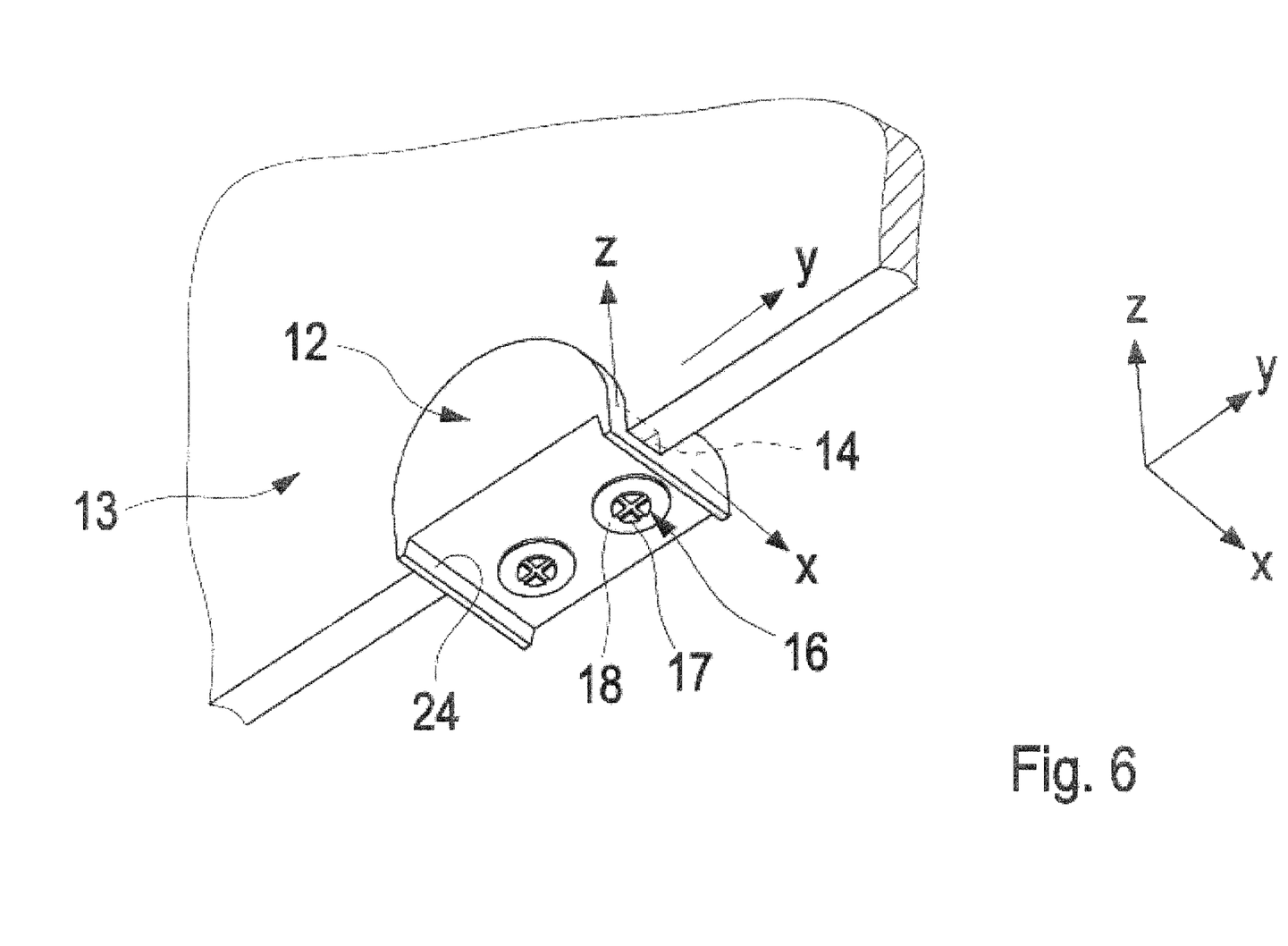
FIG. 6 shows a U-shaped fastening element arranged on a side wall.

In the Y-direction and Z-direction, tolerances may be compensated by the fastening device 9 itself, namely by the overhead storage compartment elements 1 being centred relative to one another. This occurs automatically when the screws 16 are tightened. To this end, the fastening elements 10 and/or 12 have bevelled centring chamfers 24 encompassing the connecting plate 11, as FIG. 6 illustrates. The connecting plate 11 is accordingly bevelled on its sides corresponding thereto, so that it is automatically centred when the screws 16 are tightened relative to the fastening elements 10 and/or 12. In this manner, it is possible to compensate for deviations of up to several millimeters in the Y-direction.

So that the fastening device 9 is able to transmit high forces into the overhead storage compartment elements 1, the fastening elements 10 and 12 in the main loading direction (X-direction and Y-direction) are positively arranged in the side walls 13. In the positive and negative Y-direction, the fastening element 10 is held in a recess 14 arranged on the side wall 13. The fastening element 10 shown in FIG. 4 comprises an L-shaped upper face, the one limb being supported on the inner face of the side wall 13 facing the overhead storage compartment associated therewith.

The fastening element 12 shown in FIG. 6 comprises a U-shaped upper face viewed from the Y-direction, so that the fastening element 12 positively encompasses the side wall 13 on both sides. The bonds are thereby relieved of load. Viewed in the X-direction, the fastening element 12 has a semi-circular shape. It has been shown that said semi-circular shape advantageously has an effect on the loading in the bond.

Figure 8:
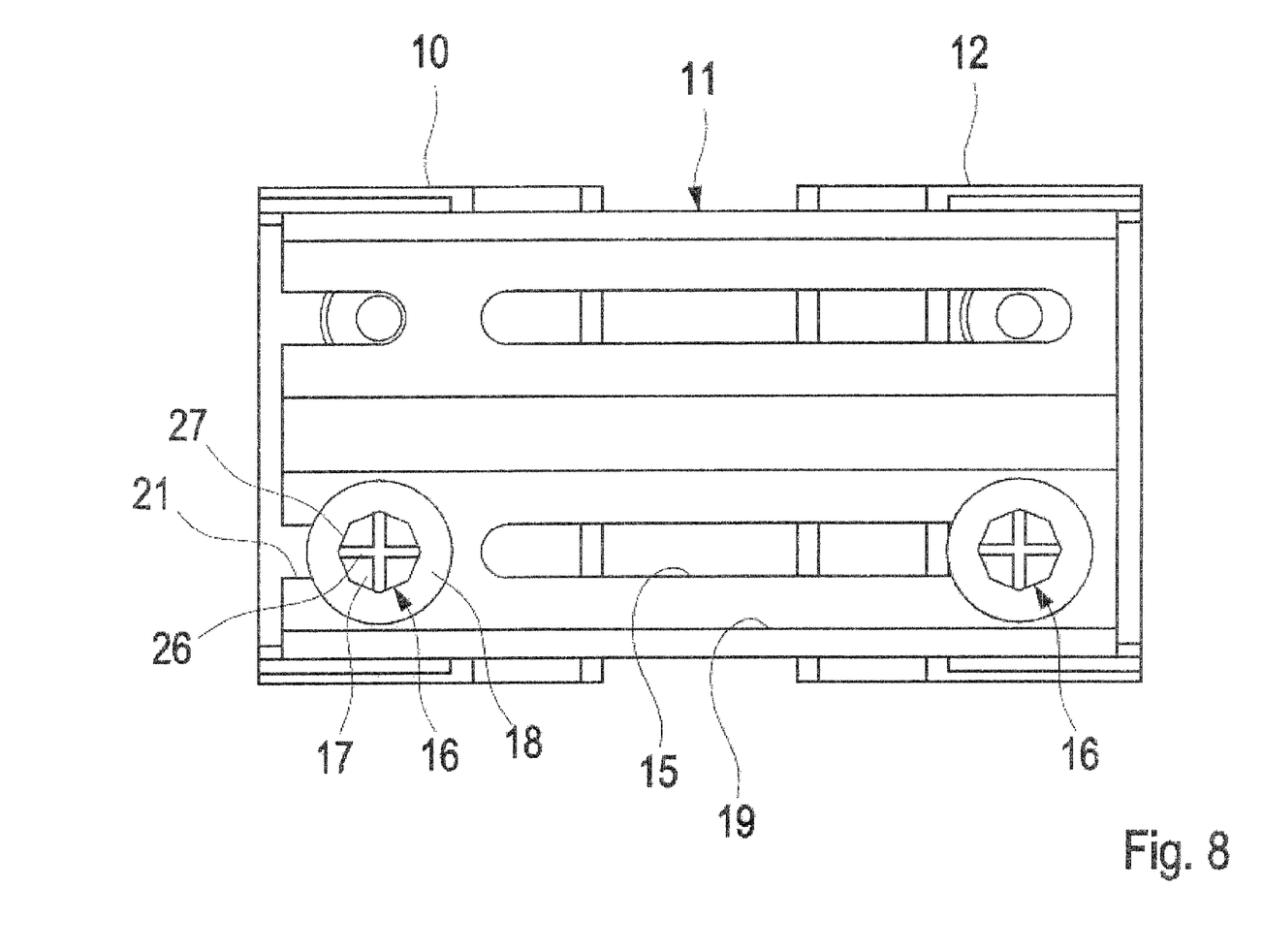
FIG. 8 shows a fastening device with a connecting plate and two fastening elements arranged thereabove and partially concealed by the connecting plate.

FIG. 8 shows a connecting plate 11 viewed from below in the Z-direction. Above said connecting plate are fastening elements 10 and 12 which are partially concealed by the connecting plate 11. In FIG. 8, the screws 16 are shown on the lower slots 15, via which the connecting plate 11 is screwed to the fastening elements 10 and 12. The screws 16 have two torque transmission regions 26 and 27 for tightening the screws 16. Firstly, a conventional crosshead slot 26 which extends over the outer peripheries of the screwhead 17 and, secondly, an external octagonal region 27. Via the octagonal region 27, the screw 16 may be more easily tightened using the fingers, whereby the handling and/or ergonomics of the fastening device 9 may be increased. The fitter may initially tighten the screws 16 hand-tight and then tighten said screws using a screwdriver.

In this manner, the time which the fitter requires for connecting the overhead storage compartment elements 1 is reduced.

Figure 9:
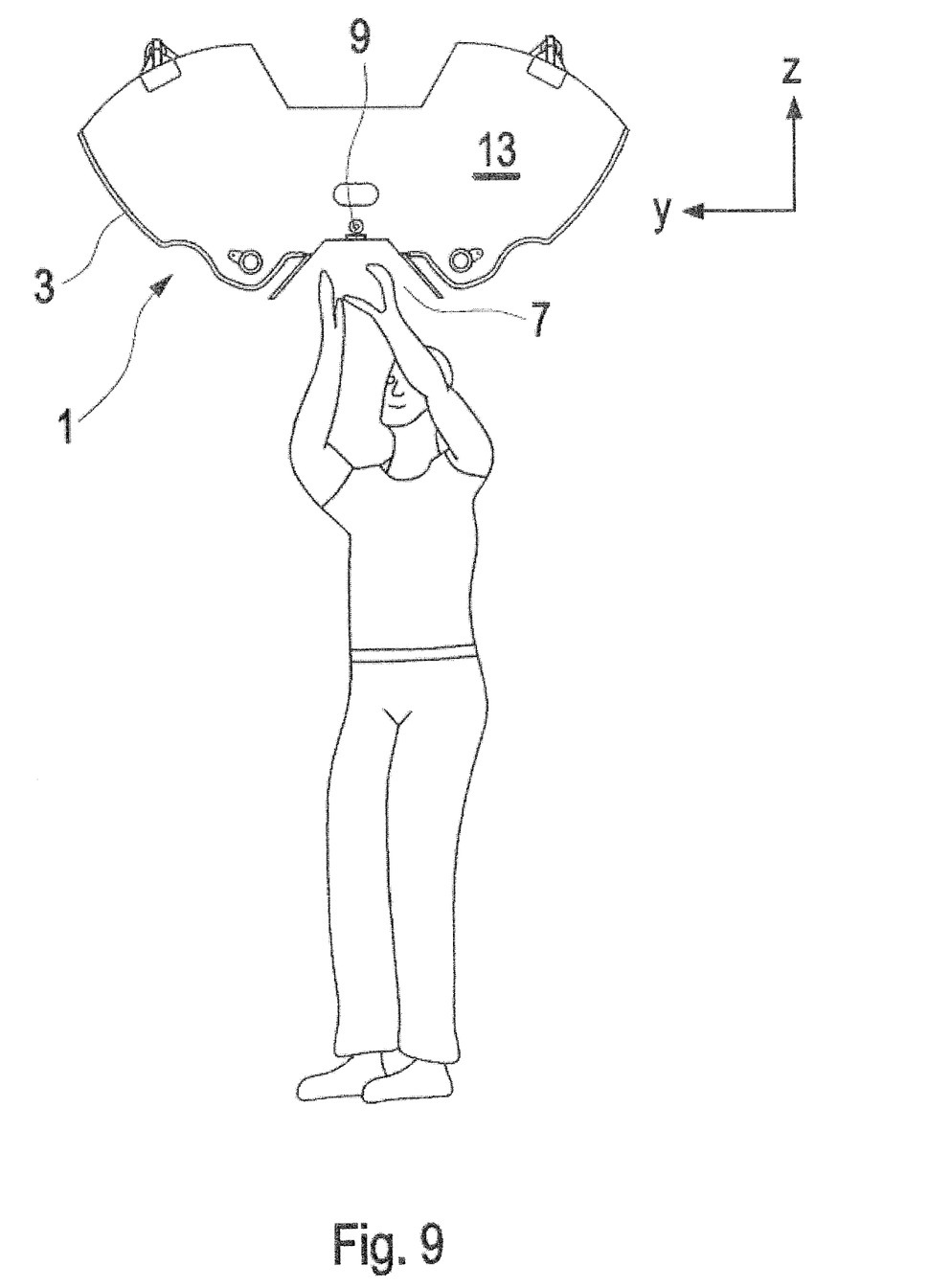
FIG. 9 shows a fitter when handling a fastening element on an overhead storage compartment element for the centre of an aircraft cabin.
Figure 10:
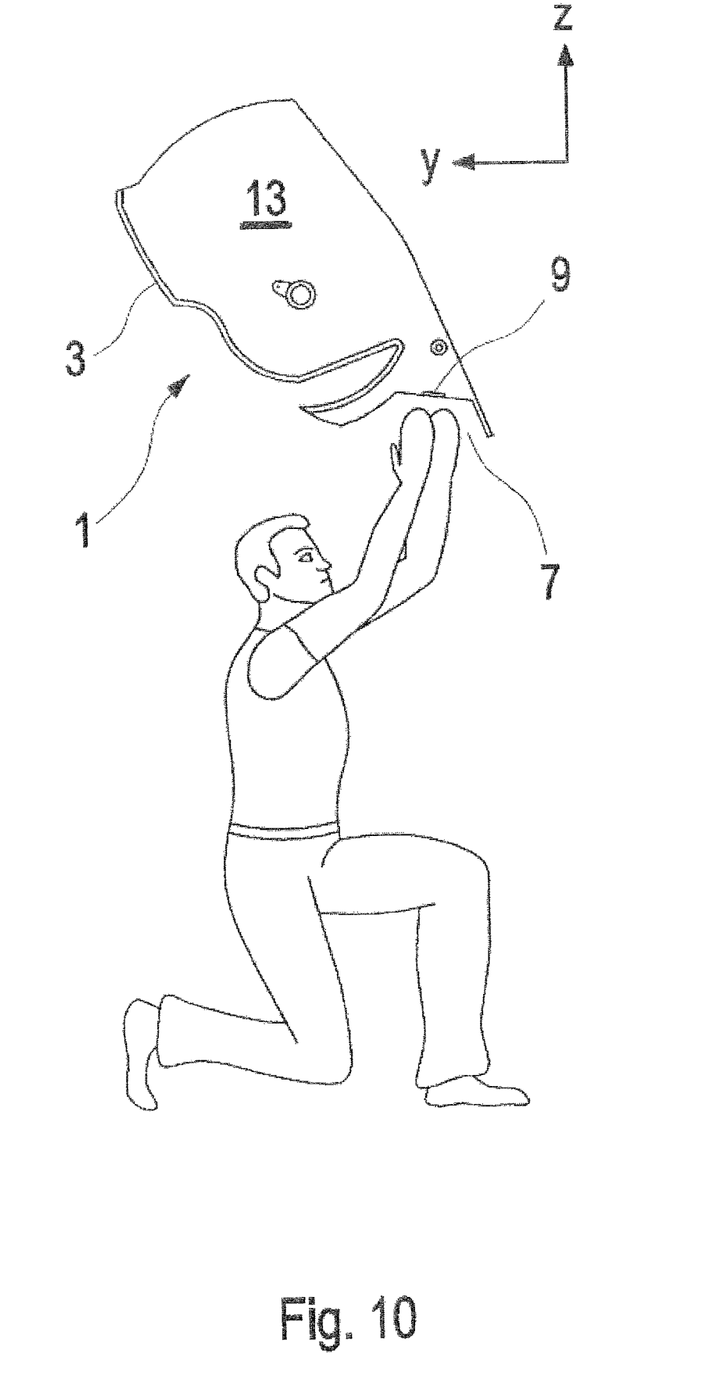
FIG. 10 shows a fitter when handling a fastening element on an overhead storage compartment element for the side of an aircraft cabin.

As shown in FIGS. 9 and 10, the fastening devices 9 are able to be easily reached from below by being arranged on side walls 13 facing one another in the centre of the passenger service channel 7. The fastening device 9 according to the invention may rapidly connect together the overhead storage compartment elements 1 with little effort, and centre said overhead storage compartment elements relative to one another such that the passenger service channel 7 extends substantially straight along the longitudinal axis, so that the passenger service units 5 may be easily fastened. By means of the fastening device 9, it is possible to compensate for tolerances of up to several millimeters.

LIST OF REFERENCE NUMERALS

1 Overhead storage compartment element
3 Storage compartment
5 Passenger service unit
7 Passenger service channel
6 Holder
8 Rail system
9 Fastening device
9.1, 9.2 Alternative fastening device
10 First fastening element
11 Connecting plate
12 Second fastening element
13 Side wall
14 Recess
15 Slot
16 Screw
17 Screwhead
18 Bearing surface
19 Grooves
21 Slot open on one side
23 Latching groove
24 Centring chamfer
25 Latching lug
26 Crosshead slot
27 Octagonal region

The invention claimed is:

1. A fastening device for at least two overhead storage compartment elements in an aircraft cabin, comprising:
    a first fastening element provided on a side wall of a first overhead storage compartment element;
    a second fastening element provided on a side wall of a second overhead storage compartment element, wherein the side wall of the first overhead storage compartment element and the side wall of the second overhead storage compartment element face each other and are operably connected to each other;
    a connecting plate, which is operably received by the first fastening element in a longitudinally movable manner, thereby permitting the connecting plate to approximate the second fastening element and to be fastened to the second fastening element, wherein the connecting plate comprises at least one slot; and
    at least one fastener connected to the first fastening element,
    wherein the at least one fastener is received within the at least one slot for permitting the connecting plate to move longitudinally along the at least one slot.

2. The fastening device according to claim 1, wherein the fastening elements comprise on their side in contact with the connecting plate at least one latching lug extending transversely to the direction of longitudinal movement of the connecting plate relative to the fastening element and designed to engage in latching grooves which are provided on the connecting plate and which also extend transversely.

3. The fastening device according to claim 1, wherein the fastening elements are bonded into recesses provided on the overhead storage compartment elements.

4. The fastening device according to claim 1, wherein the fastening elements comprise an L-shaped, upwardly facing side, which comprises a first limb that bears flat against an inner face of the side wall of the overhead storage compartment element and a second limb that bears flat in the recess against the side wall.

5. The fastening device according to claim 1, wherein the fastening element comprises a U-shaped, upwardly facing side, which comprises a first limb that bears against an inner face of the side wall of the overhead storage compartment element, a lower face that bears flat in the recess of the side wall and a second limb bears that flat against the outer face of the side wall.

6. The fastening device according to claim 1, wherein the fastening elements comprise centering chamfers, which centre the connecting plate when fastening the connecting plate.

7. The fastening device according to claim 1, wherein the connecting plate is connected via said at least one fastener to the fastening elements, and said at least one fastener is comprised of screws.

8. The fastening device according to claim 7, wherein the screws comprise a first torque transmission region arranged on the outside of a screwhead and a second torque transmission region arranged centrally on the screwhead.

9. A method of connecting together overhead storage compartment elements in an aircraft cabin by using a fastening device comprising:
    a first fastening element provided on a side wall of a first overhead storage compartment element;
    a second fastening element provided on a side wall of a second overhead storage compartment element, wherein the side wall of the first overhead storage compartment element and the side wall of the second overhead storage compartment element face each other and are operably connected to each other;
    a connecting plate, which is operably received by the first fastening element in a longitudinally movable manner, thereby permitting the connecting plate to approximate the second fastening element and to be fastened to the second fastening element, wherein the connecting plate comprises at least one slot; and
    at least one fastener connected to the first fastening element,
    wherein the at least one fastener is received within the at least one slot for permitting the connecting plate to move longitudinally along the at least one slot.

* * * * *